March 17, 1936. Z. KITAMURA 2,034,473
STEAM COOKING AND HOT WATER HEATING SYSTEM
Filed Feb. 27, 1934
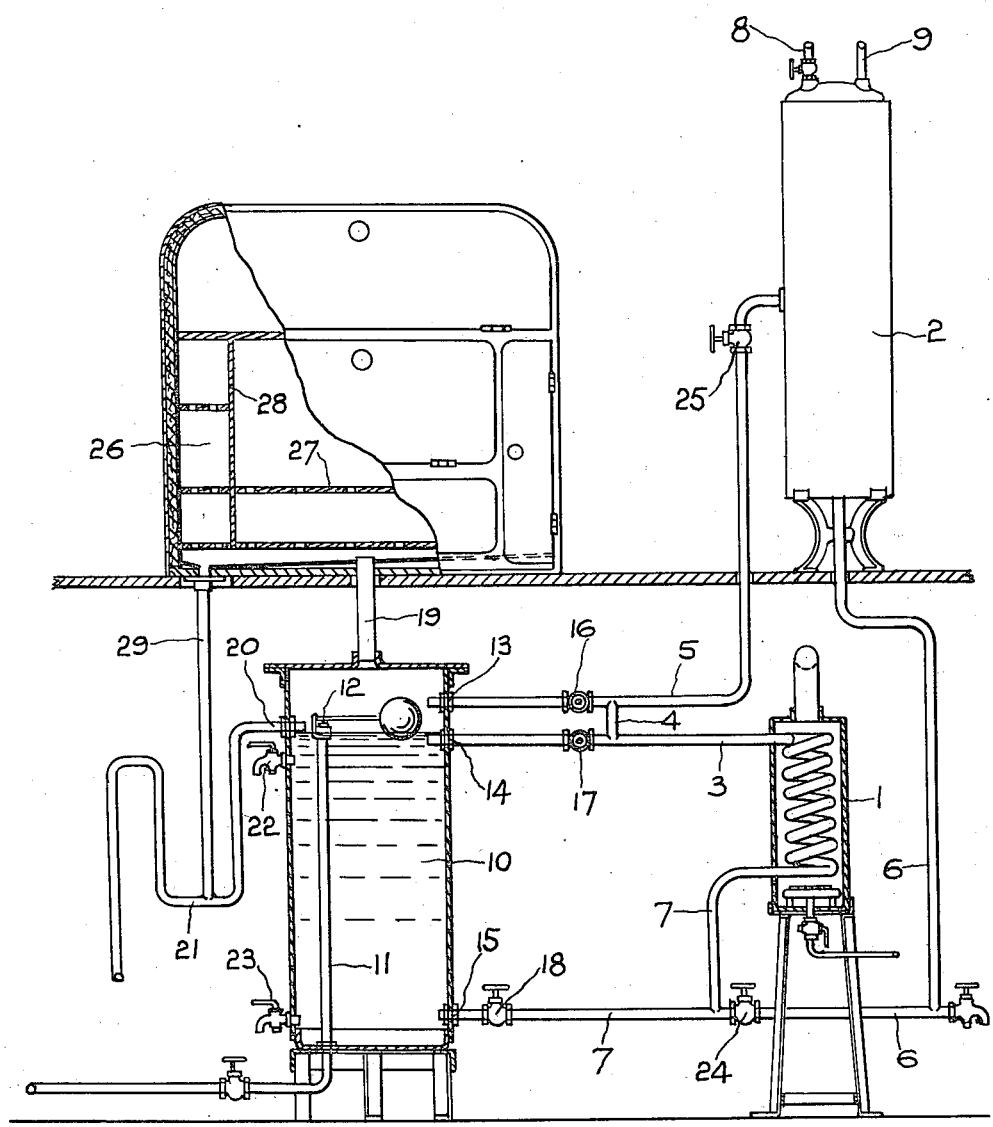
INVENTOR
ZENKURO KITAMURA
BY Featherstonhaugh & Co
ATTORNEYS Patented Mar. 17, 1936

2,034,473

UNITED STATES PATENT OFFICE 2,034,473

STEAM COOKING AND HOT WATER HEATING SYSTEM

Zenkuro Kitamura, Vancouver, British Columbia, Canada

Application February 27, 1934, Serial No. 713,169

2 Claims. (Cl. 126—348)

My invention relates to improvements in steam cooking and hot water heating systems, the objects of which are to employ as a source of supply, the water back of a cooking range or other hot water heater such as the conventional gas water heater usually installed in homes or relatively small institutions; to provide means whereby low and constant pressure steam may be provided at will for use in a steam cooker and any condensate of steam not utilized in the steam cooker shall be maintained as a hot water reserve or be recirculated to the primary water heater.

The invention consists essentially of a primary heater or boiler, a steam and water tank, a steam cooker and a circuit between the primary heater and the tank for water, and a further circuit for steam, as will be more fully described in the following specification and shown in the accompanying drawing.

The drawing is a general view of the invention.

The numeral 1 indicates generally a gas water heater, the water front of a cooking range or other suitable primary heater, which is connected to a hot water tank 2 through flow pipes 3, 4 and 5, and through return pipes 6 and 7. The hot water tank 2 is connected also with a water inlet pipe 8 and an outlet pipe 9 in the customary way.

Adjacent the primary heater 1 is a sealed tank 10 having a water inlet pipe 11 provided with a float valve 12 of any suitable type, this tank is provided with a steam inlet 13, a hot water inlet 14, and a return outlet 15, which communicate respectively with the pipes 5, 3 and 7 and are controlled by valves 16, 17 and 18.

The tank 10 is provided with a steam outlet 19 and a water overflow 20 which discharges into a trap 21, it is also preferably fitted with draw off valves 22 and 23 connected respectively somewhat below the normal water level of the tank and at its base, so that water can be drawn from the tank at different temperatures if desired.

A valve 24 is connected in the pipe 6 and a valve 25 is connected in the pipe 5.

The numeral 26 indicates a steam cooker of any suitable type having perforated shelves 27 and dividing walls 28, extending through the base of the cooker is the steam pipe 19 and leading from a suitabe part thereof is a condensate pipe 29 which connects directly with the trap 21. When the cooker 26 is not required, the valves 16, 17 and 18 are closed, so that the water from the primary heater 1 is circulated through the pipes 3, 4 and 5, through the hot water tank 2 and back to the heater through the pipe 6.

Should hot water only be required from the tank 10, the valves 24 and 25 are closed and the valves 17 and 18 are opened so that circulation through the tank 2 is stopped and the water from the primary heater 1 is circulated through the tank 10 and its water level is maintained above the pipe 14 by the ball valve 12.

When steam cooking is to be done, the valve 17 is closed and the valve 16 is opened, the closing of valve 17 prevents water from circulating through the primary heater except in such quantity as is evaporated into steam therein, and the steam consequently flows into the tank 10, thence into the cooker 26, such condensation as takes place in the cooker is discharged into the trap 21. The steam temperature will be controlled within very narrow limits since any increase of pressure in excess of the pressure due to head of water in the trap will force the water out of said trap and permit the steam to discharge freely, so that as the pressure must at all times be substantially atmospheric and the temperature will necessarily remain at around 212 degrees Fahrenheit.

What I claim as my invention is:

1. The combination with a steam cooker, a primary heater, a sealed tank connected to the cooker to supply steam thereto, means for maintaining a substantially constant water level in the tank, a pipe leading from the heater to the tank for discharging hot water thereinto at the water level and a further pipe communicating with the heater for discharging steam into the tank above the water level, said pipes being valved to selectively permit a flow from the heater to the tank at the water line or to the tank above the water line, and a water return pipe from the tank to the heater, and a water trap connected to said tank above the normal water level and adapted to be sealed by condensate from steam in said tank and by condensate from the cooker, said trap serving to prevent the steam in the tank from rising substantially above atmospheric pressure.

2. The combination with a steam cooker, a primary heater, a sealed tank, a steam flow pipe from the heater to the tank and a water return pipe from the tank to the heater, means for maintaining the water therein at a constant level and to define a steam space, a discharge outlet from the tank above the water level, a water trap connected to said discharge outlet, a pipe communicating between the steam space and the cooker and a condensate pipe from the cooker communicating with the base of the water trap.

ZENKURO KITAMURA.